United States Patent [19]

Betz

[11] Patent Number: 4,553,447
[45] Date of Patent: Nov. 19, 1985

[54] PRESSURE SUPPORT MEANS IN RACK AND PINION STEERING

[75] Inventor: Ansgar Betz, Schwabisch Gmund, Fed. Rep. of Germany

[73] Assignee: Zahnradfabrik Friedrichshafen, AG., Friedrichshafen, Fed. Rep. of Germany

[21] Appl. No.: 556,389

[22] Filed: Nov. 30, 1983

[30] Foreign Application Priority Data

Dec. 2, 1982 [DE] Fed. Rep. of Germany ....... 3244531

[51] Int. Cl.$^4$ .............................................. F16H 1/04
[52] U.S. Cl. .................................. 74/422; 74/89.17; 74/498; 180/148
[58] Field of Search ...................... 74/422, 89.17, 498; 180/148

[56] References Cited

U.S. PATENT DOCUMENTS

| 2,505,381 | 4/1980 | Brequet et al. | 74/89.17 |
| 2,838,952 | 6/1958 | Seeliger | 74/498 |
| 2,935,150 | 5/1960 | Smith et al. | 180/148 |
| 2,936,643 | 5/1960 | Smith et al. | 74/498 |
| 2,964,967 | 12/1960 | Osborne | 74/498 |
| 3,500,699 | 3/1970 | Matsuda | 74/498 |
| 3,500,700 | 3/1970 | Matsuda | 74/422 |
| 3,718,051 | 2/1973 | Eck | 74/422 |

Primary Examiner—Henry C. Yuen
Attorney, Agent, or Firm—Zalkind & Shuster

[57] ABSTRACT

Parallel ball bearing arrays are utilized in a pressure support means for a rack to reduce friction of a stationary pressure means supporting a moving rack in engagement with a drive pinion. The rack and a pressure pad have face to face coacting ball races on each side of the rack and so oriented that median planes of a pair of facing races are at an angle to the median plane of the rack. Accordingly, a train of balls on each side of the rack in the respective pair of coacting races has a median plane at an angle to the median plane of the rack on each side of the rack. Such orientation gives support normal to the rack and laterally as well, at the area where the rack engages the pinion.

20 Claims, 5 Drawing Figures

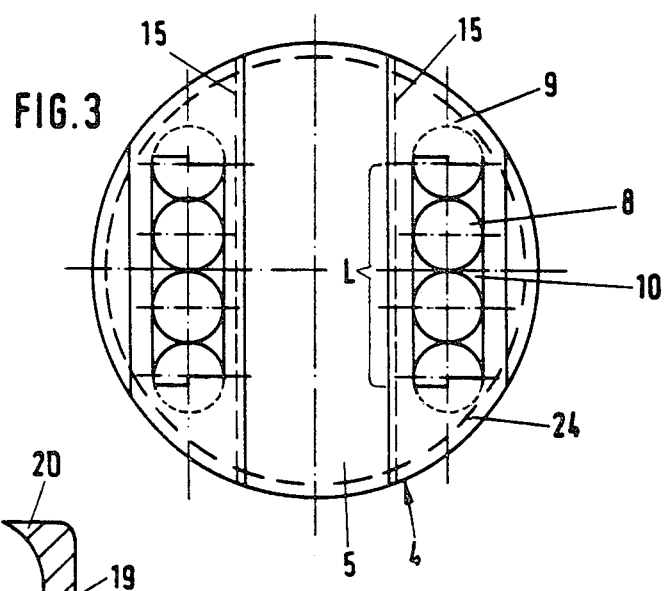
FIG. 3
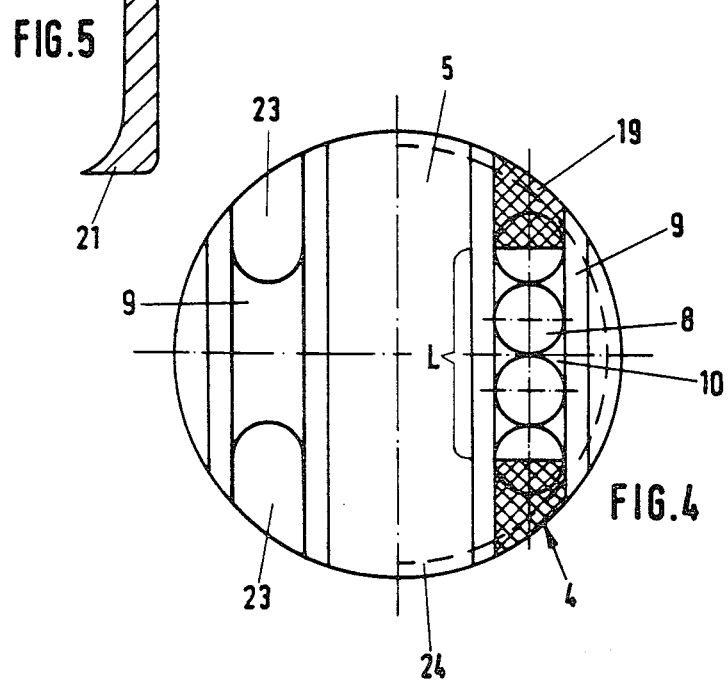
FIG. 5
FIG. 4

PRESSURE SUPPORT MEANS IN RACK AND PINION STEERING

In rack and pinion steering for vehicles where a rack is driven by a pinion it is necessary to provide a pressure means against the rack in the area where it is engaged by the pinion in order to insure proper tooth meshing.

BACKGROUND OF THE INVENTION

Rack and pinion steering is well known and is exemplified for example, in German Pat. No. 2,736,631 of Feb. 22, 1979, wherein the pressure means exerting a force on the rack comprises a pressure pad spring-biased against the rack. However, in a later patent, U.S. Pat. No. 2,935,150, there is shown in FIGS. 6–8, a pressure means wherein the pad comprises parallel arrays of ball-bearings having a surface engaging in grooves of the rack. Such arrangement provides only support in a direction normal to the path of the rack and does not provide any lateral support. Presumably, in an arrangement as thus shown in FIGS. 6–8, lateral support must be achieved by additional and somewhat expensive guide means in the housing which carries the pressure means. Further, there is no information in the patent as to how the endless ball arrays are inserted into the pressure pad in which they are carried.

FIGS. 9–11 of Patent 2,935,150, show a method of providing pressure support by means of ball arrays, such support being in directions normal to the rack and laterally. This is accomplished by means of a pair of endless ball arrays as seen in FIG. 11 which are disposed on each side of the rack at an angle to the rack in the sense of having angularity to the path of movement of the rack. Thus, a line of balls in each array is guided in a respective pair of races wherein one race is fashioned at each of the corners of the rack for each pair. The return race is presumably in the pad together with connecting races for each of the respective ball arrays, the details of which are not disclosed.

The previously described arrangement gives a rolling action of the rack to reduce friction as well as the lateral support afforded by the angularity of the pressure pad arrangements shown in FIG. 11. However, there are certain drawbacks in connection with the teaching in that the plural channels required to be machined for the two pressure pads is not only very expensive, but considerably weaken the housing. Further, since each such pad requires its own biasing spring to be adjusted in order to equalize the pressure forces on the rack there is difficulty in effecting such equalization.

In order to achieve a pressure support means for a rack which will reduce the relatively high wear occurring in racks which have sliding friction, as contrasted with rolling support, and in order to overcome the drawbacks in the prior art, as outlined above, the present invention features the elimination of special lateral guidance members as well as an economy in manufacture of a ball bearing type mounting in the use of a single pressure pad and elimination of any need to equalize the bias of a pair of springs.

The present invention effects a high efficiency mechanism which is simple and safe for its intended uses and in particular lends itself readily to mass production.

The teaching herein cannot only safely absorb lateral forces on the rack, but especially in conjunction with helical gearing pinion arrangements.

Further, the novel construction herein disclosed utilizes a rack having lateral wings or shoulders which rest on the balls exposed to respective shoulders and carried in parallel endless arrays on respective sides of the median plane of a rack. Such construction permits a rack design wherein said shoulders can be disposed as closely as possible to the area of meshing with the pinion. This has the advantage of minimizing tilting forces on the rack and thus reduce wear on the balls as well as increasing precision of the steering operation.

Basically, the novel construction has the advantage of economy of parallel endless ball arrays, plus the advantage of providing normal and lateral support forces to a rack. This is brought about by coacting races on each side of the rack wherein one such race is in the rack and the other in the pressure pad so juxtaposed that there is a line of force normal to the rack and a line of force angular to the rack for lateral support.

In actuality such lateral support is spread over an area of the balls having a large component of lateral force support normal to the medium plane of the rack. In order to achieve this effect, the races in the pressure pad on each side of the rack are so fashioned that there is a high wall at one side of each race with a low wall at the opposite side wherein the high walls are further distanced from the rack than the low walls. This supports the line of balls which engage the rack against lateral forces exerted by the rack.

In order to conveniently achieve such race support arrangement, the races are in slanted walls at the end of the pressure pad and in slanted walls of the rack which form the aforementioned shoulders. Thus, the slanted walls on the end of the pressure pad are complimentary and opposed to respective slanted walls of the rack.

Other details of the assembly of the pressure means including other components will be described hereinafter save to say that the return ball channels in the pressure pads between the line of balls at each end of the pad can be achieved by drilling and an economy effected by advancing the drill points starting from one end of the pressure pad to the active ball line end, but without pushing the drill point through the surface at that end. Accordingly, there remains a guiding wall at the angle of the drill point which guides balls to and from return channels to the active line of balls in the endless array on both sides of the rack.

A modification is disclosed in which a separate piece forms return channels as well as races in the pressure pad which has an advantage that drilling is eliminated and, optionally, a closure.

A detailed description follows in which:

FIG. 3 is a plan view of the form of the invention shown in FIGS. 1 and 2 with the rack being removed so as to show the lines of balls which engage the rack on each side thereof;

FIG. 4 is a plan view of an embodiment using separate pieces for three of the four races of the endless ball array, for enclosure of races machined into the pressure pad wherein the right side of FIG. 4 illustrates such retaining pieces in position and the left side illustrates the grooves of races in the pressure pad, the retaining race members not being shown, and FIG. 5 illustrates one of the four separate race members utilized in the construction illustrated in FIG. 4 as part of the assembly of a pressure pad.

Figure 1:
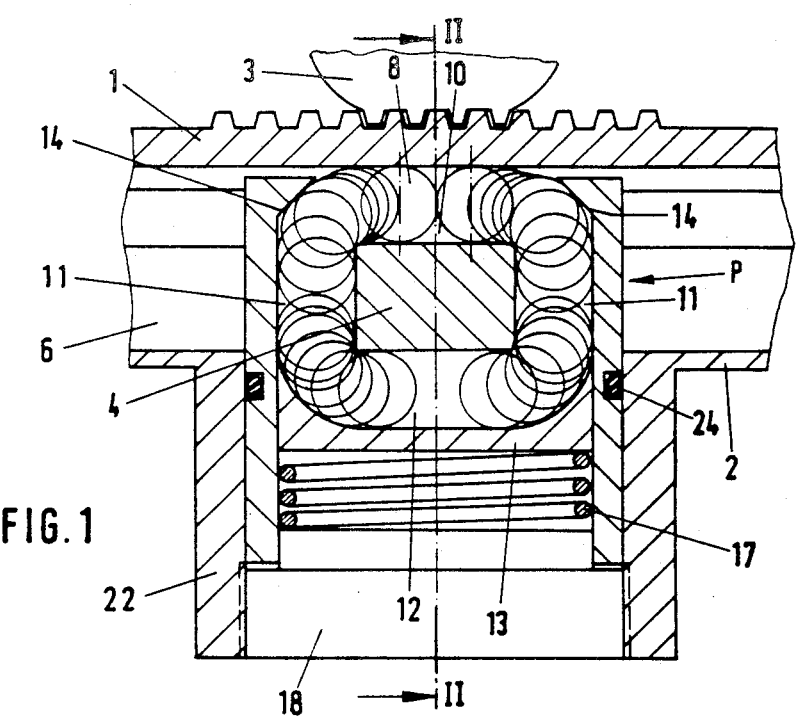
FIG. 1 is a longitudinal section on the line I—I of FIG. 2, certain components being omitted for clarity.
Figure 2:
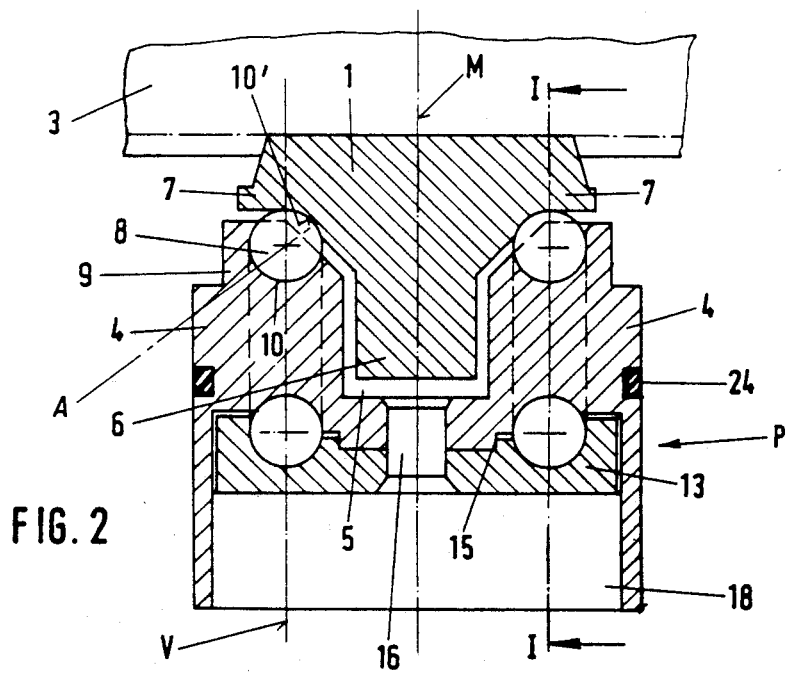
FIG. 2 is a transverse section on the line II—II of FIG. 1; but omitting the rack support housing and adjusting screw of FIG. 1.

Referring to the modification shown in FIG. 1-3, a rack 1 is supported at one end in the usual manner in a housing 2, the details of support not being shown inasmuch as such construction is well known and only details of a pressure means support need be described. The rack meshes with a pinion 3 and is supported by the pressure means P which comprises a pressure pad 4 in rack housing extension 22.

The pad 4 is generally cylindrical and has a central recess 5 wherein at the bottom is a bore for a purpose later described. The rack extends with a depending central rib 6 into the recess 5 the rib being spaced from the walls of the recess to avoid friction inasmuch as seen in FIG. 2 the rack moves in and out of the plane of the paper. Wings or shoulders 7 are formed integrally with the rack and provide slanting surfaces on each side of the median plane M thereof and in which surfaces are formed races 10' for a respective line L of balls 8. Each such line of balls 8 engages the rack and is one side of an endless respective array of ball bearings.

Depending upon the required stiffness of rack 1, the proximity of shoulders 7 can be designed to be as close as possible to the mesh area with pinion 3.

Pressure pad 4 is thus provided with two spaced walls 9 at the sides of recess 5 and the end of the pressure pad facing the rack, namely, the top surfaces of the walls 9 are provided with ball races 10 for a line of balls resting in each race 19 which engage rack 1 and provide the supporting force thereto normally and laterally while permitting the rack to roll in either direction.

Thus, a coacting pair of races 10, 10' is disposed symmetrically on each side of rack 1 for guiding thrust receiving balls 8 rolling in such races.

Races (10) have outer walls higher than the inner walls for for lateral support of the lines of balls therein.

The line of balls in races 10, 10' being one side of an endless array, side races 11 connecting with return race 12 at the opposite end of pressure pad 4, as indicated in FIG. 1, for a complete ball circuit is provided.

Such races 12 at the opposite end of pressure pad 4, as shown in FIG. 2, are formed in conjunction with races formed in a closure plate 13 to effect return channels in conjunction with the side channels 11 which are drilled bores in the pressure pad. However, the drill point only reaches the end surface, without cutting through it. Accordingly, a catty-corned surface 14 is formed which is the drill point angle and which advantageously provides a direction changing guide for the balls in the endless array in both directions of movement, clockwise, or counterclockwise, as seen in FIG. 1.

Circular closure 13 has a keyed connection with pressure pad 4 at the linear edge 15 extending parallel to the longitudinal axis of the rack. This prevents undesirable relative twisting of the closure plate 13 and the pressure pad.

The closure plate 13 is connected with pressure pad 4 by means of a rivet 16 passing the bore at the bottom of recess 5 and aligned with a bore in the closure plate 13.

For adjustable support force of the pressure pad by way of contact pressure without looseness or play, a conventional spring 17 is utilized placed under compression against the closure plate 13 by an adjusting screw 18 threaded into the housing extension 22.

A sealing ring 24 encompasses pressure pad 4 within the housing extension 22.

Referring now to the modification of FIGS. 4 and 5, the general construction and arrangement is the same as previously described except that retainer members 19 are used at each corner of the endless ball arrays as indicated in the right side of FIG. 4, it being understood that four such separate components would be used.

Such components are shaped so as to expose the force line of balls to engage a rack as illustrated in FIG. 1. Thus, balls 8 at one end of wall 9 guided in race 10 are shown.

However, in this instance, the pressure pad 4 is provided with recesses 23 from one end to the other longitudinally in the outer cylindrical wall and the inner ends of such are semicircular as seen on the left half of FIG. 4 to provide side races. These are closed off in each instance by a member 19 forced into the recesses and forming the side ball channels corresponding to channels 11 of FIG. 1. To guide the balls at the corners of the configuration, the members 19 are provided with curve formations at their ends 20 and 21, the curved formations 21 being used since there is no corner guidance provided by a closure plate 13 in this instance. However, the arrangement could be as shown in FIG. 1 for closure plate 13, in which case the curvature formation 21 would not be needed.

Members 19 which provide walls for retaining a full circuit of ball arrays may be made of plastic for friction reduction although other materials are feasible. Preferably, the pressure pad material should be steel for stability.

As seen in FIG. 4, the sealing ring 24, an O-ring, surrounds pressure pad 4 and thus acts not only for sealing purposes, but for holding the members 19 in the assembly.

It will be appreciated that the reference characters M, A, V, on FIG. 2, depict the traces of the planes so designated, expedient in describing the support directions of the two lines of rack engaging support balls of the endless rings of balls are at any moment rolling between races 10, 10'. Such planes as M and V are generally parallel for normal support while planes M and A have angularity for lateral support.

The particular angularity may vary dependent on the chosen heights, sizes and spacings of the walls and spread of the shoulders 7 together with the thicknesses of the components. These and other factors may make variations desirable, as compared with the exemplary showing of FIG. 2.

Various forms of races are usable, e.g., although semicircular races or partially circular races are shown, it will be appreciated that other shapes are usable.

I claim:

1. In a rack and pinion steering mechanism for vehicles having a toothed rack in a housing which rack meshes with a pinion and is supported by a pressure pad carried in the housing, including balls in parallel races intermediates said pressure pad and said rack;

characterized in that:

the rack (1) having at both longitudinal sides supporting shoulders (7) adjacent its teeth with races (10');

the pressure pad (4) in the area of the perpendicular longitudinal middle plane of the rack (1) having a recess (5);

the pressure pad (4) having side walls (9) adjacent the recess (5) with races (10) coacting with the races of the rack to form an angular support for the rack;

the outer edges of the pressure pad walls being higher than the inner edges adjacent the recess;

at least two ball races (11) being disposed in the pressure pad each extending approximately normal to the rack and respective return races (12) extending parallel to the plane of the rack and on the side of the pressure pad opposite to the side having the aforementioned balls intermediate the pressure pad and the rack.

2. In a rack and pinion mechanism having a housing (2) and pressure means (P) therein comprising parallel endless ball arrays (B) on respective sides of the median plans (M) of a rack (1);

including coacting races (10, 10') for said ball arrays on respective sides of said rack and on respective sides of said pressure means for rolling support of said rack;

the improvement wherein:

the ball arrays are in planes normal to the rack:

the coacting ball races on each side of said rack and pressure means are in ball retaining face to face relation with the races of said rack and the coacting races of said pressure means being disposed so that support forces on respective flights of balls therebetween are in planes (A) angularly related to respective sides of the median plane (M) of said rack for ball support of said rack in normal and lateral directions.

3. In a rack and pinion mechanism as set forth in claim 1, said rack having inclined shoulders (7) with respective coacting ball races (10') therein;

said pressure means having respective complementary inclinations with respective coacting ball races (10) therein effecting means for holding lines (L) of balls in rack engagement between said coacting races so that support forces normal to said rack are in median planes (V) of balls in said coacting races and lateral support forces are in median planes (A) of said balls, said latter planes being angularly related to said first mentioned median planes in symmetrical arrangement on respective sides of the median plane of said rack.

4. In a rack and pinion mechanism as set forth in claim 1, wherein said coacting ball races have an angular relationship (A) to said median plane (M) of said rack on each side thereof such that balls in said coacting races having lateral thrust bearing support forces on respective sides of said rack are in planes (A) which intersect the median plane (M) of said rack on the same line.

5. In a rack and pinion mechanism as set forth in claim 1, said rack and pressure means having inclined opposed surfaces on each side of said rack in which surfaces a pair of coacting races (10, 10') are disposed with one race in each said surface;

the races (10) in said pressure means each having an outer wall and an inner wall relative to the rack;

wherein the outer walls of said latter races are higher than said inner walls for effecting lateral support to balls in said coacting races.

6. In a rack and pinion mechanism as set forth in claim 1, said pressure means comprising a pressure member (4) having inclined end surfaces on respective sides of said rack and said rack having complementary respective inclined end surfaces;

said coacting ball races for each ball array being in respective said surfaces to guide balls therebetween;

said pressure member having an opposite end provided with ball races (12), (19) for each said ball array; and means (11), (23) providing races in said pressure member joining said aforementioned races.

7. In a rack and pinion mechanism having a rack support pressure means (P) comprising a pressure pad (4) having ball arrays with a ball support race (10) disposed on each side of a median plane (M) of a supported rack (1); said rack having ball races (10') coacting with respective ball races of said pressure pad for guiding lines of rack support balls (8) therebetween;

said ball arrays being in planes (V) parallel to the median (M) plane of said rack;

the improvement wherein:

the coacting ball races of said rack and of said pressure pad are in face to face relationship angularly disposed relative to said median plane of said rack so that in forces of rack support by balls guided by said coacting races are directed to provide lateral support to said rack and support normal thereto, said forces being in a plane (A) on each side of said rack intersecting said median plane by virtue of face to face angular relationship of said coacting ball races relative to median plane of said rack.

8. In a rack and pinion mechanism as set forth in claim 7, wherein said ball arrays effect respective endless rings of balls around said pressure pad (4);

said pressure pad being provided with return races (12) and respective side channels (11, 19) for continuity of ball guidance between said ball support and return races.

9. In a rack and pinion mechanism as set forth in 8, wherein said side channels (11) for each ball array are effected by drilling from the ends of said return races (12) to respective ends of respective pressure pad races (10) for lines of said balls.

10. In a rack and pinion mechanism as set forth in claim 9, said drilling being limited to effect angular ball guiding surfaces (14) at each end of said latter pressure pad races whereby angularity is that of a drill point used for drilling.

11. In a rack and pinion mechanism as set forth in claim 8, wherein said side channels comprise open face races (23) recessed into the pressure pad and respective separate closure members (19) fitted into said recesses.

12. In a rack and pinion mechanism as set forth in claim 11, wherein said closure members are shaped with ball guiding end portions (20, 21) covering the ends of respective pressure pad races (10) and the return races (12) in said pressure pad.

13. In a rack and pinion mechanism as set forth in claim 12, wherein said closure members are of plastic material.

14. In a rack and pinion mechanism as set forth in claim 12, the ball guiding end portions covering the ends of the return races being operative to fully cover said return race.

15. In a rack and pinion mechanism as set forth in claim 12,
including a retaining ring (24) surrounding said pressure pad and closure members for assembly retention.

16. In a rack and pinion mechanism as set forth in claim 15, and further including a housing for said rack; the further improvement wherein:
said pressure means has an extension housing (22) carried in said rack housing;
said retaining ring effecting a seal therewith.

17. In a rack and pinion mechanism as set forth in claim 7,
said pressure pad comprising a pair of spaced walls (9) with a recess (5) therebetween and said pressure pad races (10) which coact with said races of said rack being at exposed ends of said walls facing said rack;
said recess being provided with a bore intermediate said walls;
a closure plate (13) enclosing the opposite end of said pressure pad and enclosing said return races and secured thereto by a rivet through said bore.

18. In a rack and pinion mechanism as set forth in claim 8,
including a closure plate (13) provided with respective complementary races and enclosing said return races.

19. In a rack and pinion mechanism as set forth in claim 8,
including a closure plate (13) being riveted to said pressure pad and enclosing said return races.

20. In a rack and pinion mechanism as set forth in claim 17 wherein said rack has a housing,
the further improvement wherein:
said housing for said rack having means comprising an adjusting screw (18) threaded therein for movement relative to said pressure pad;
a compression spring (17) disposed to support said pressure pad;
said adjusting screw providing means for adjusting spring bias on said pressure pad to vary support force on said pressure pad.

* * * * *